United States Patent [19]

Caparros

[11] Patent Number: 5,607,384
[45] Date of Patent: Mar. 4, 1997

[54] APPARATUS AND PROCESS FOR SAFELY CONTAINING AND DELIVERING HAZARDOUS FLUID SUBSTANCES FROM SUPPLY CYLINDERS

[76] Inventor: Rudolph Caparros, 3641 Turnberry Cir., Santa Rosa, Calif. 95430

[21] Appl. No.: 501,606

[22] Filed: Jul. 12, 1995

[51] Int. Cl.⁶ .................................................. B65D 25/00
[52] U.S. Cl. .......................................... 588/259; 588/260
[58] Field of Search ..................................... 588/259, 260, 588/249, 250; 137/343, 581, 587, 590

[56] References Cited

U.S. PATENT DOCUMENTS

| | | | |
|---|---|---|---|
| 2,879,785 | 3/1959 | Vesterdal et al. | 137/585 X |
| 3,963,144 | 6/1976 | Berwald | 137/382 X |
| 4,672,366 | 6/1987 | Butts | 588/260 |
| 5,222,517 | 6/1993 | Zink et al. | 137/350 |
| 5,254,798 | 10/1993 | Zoback | 588/249 X |
| 5,332,335 | 7/1994 | Daul | 588/249 X |

*Primary Examiner*—Stephen J. Novosad
*Attorney, Agent, or Firm*—Frank L. Kubler

[57] ABSTRACT

An apparatus for safely delivering a hazardous fluid substance to a receiving structure includes a supply cylinder containing the fluid substance and having a supply cylinder release port; a high pressure containment vessel having a vessel wall, for receiving and safely enclosing the supply cylinder; a high pressure first tube extending from, and in fluid communication with, the supply cylinder release port to a vessel port in the vessel wall; and a vessel valve in fluid communication with the first tube for controlling delivery of the fluid substance from the supply cylinder and from the vessel. The vessel valve preferably includes a fluid substance sensing valve assembly mounted in the vessel port, for automatically shutting off the flow of the fluid substance at the vessel port upon detection of the fluid substances outside the containment vessel. The vessel valve preferably includes a reduced orifice controller. A process of delivering a hazardous fluid substance from a supply cylinder having a supply cylinder release valve using the above-described apparatus, including the steps of placing the supply cylinder into the containment vessel; connecting the supply cylinder release valve to the tube extending within the containment vessel; opening the cylinder release valve and the vessel valve to deliver the fluid substance from the supply cylinder and from the containment vessel.

9 Claims, 5 Drawing Sheets

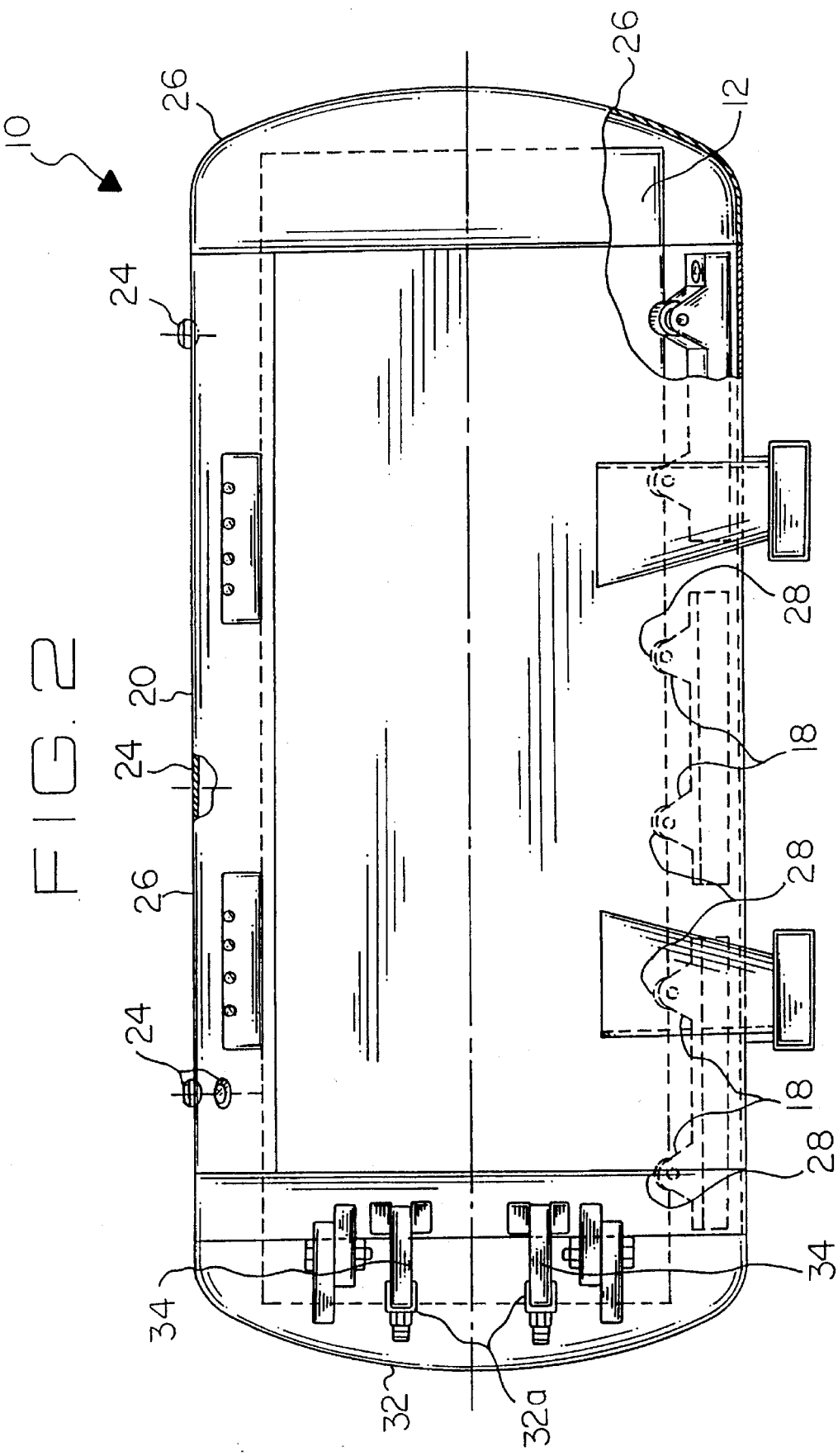

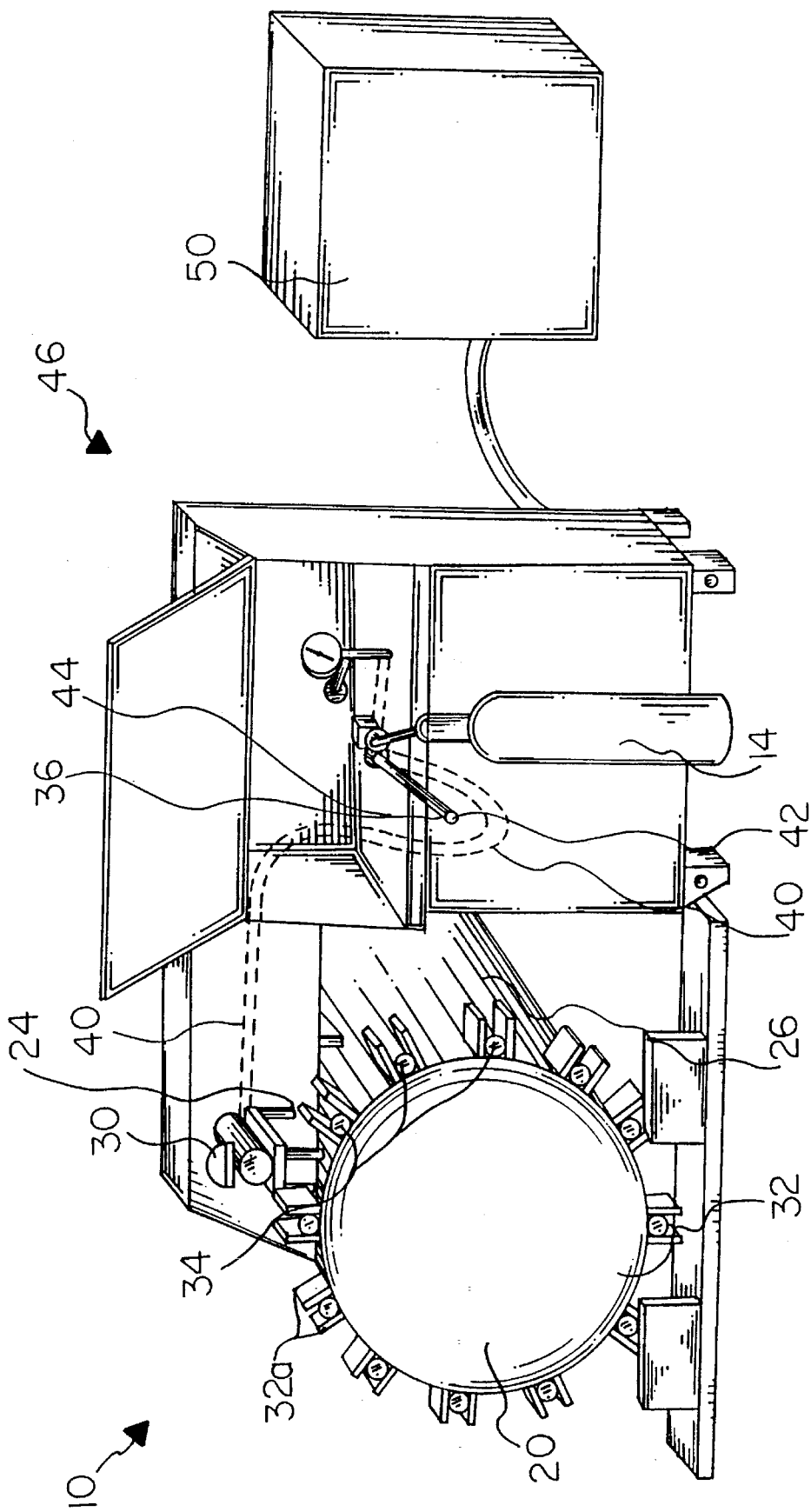

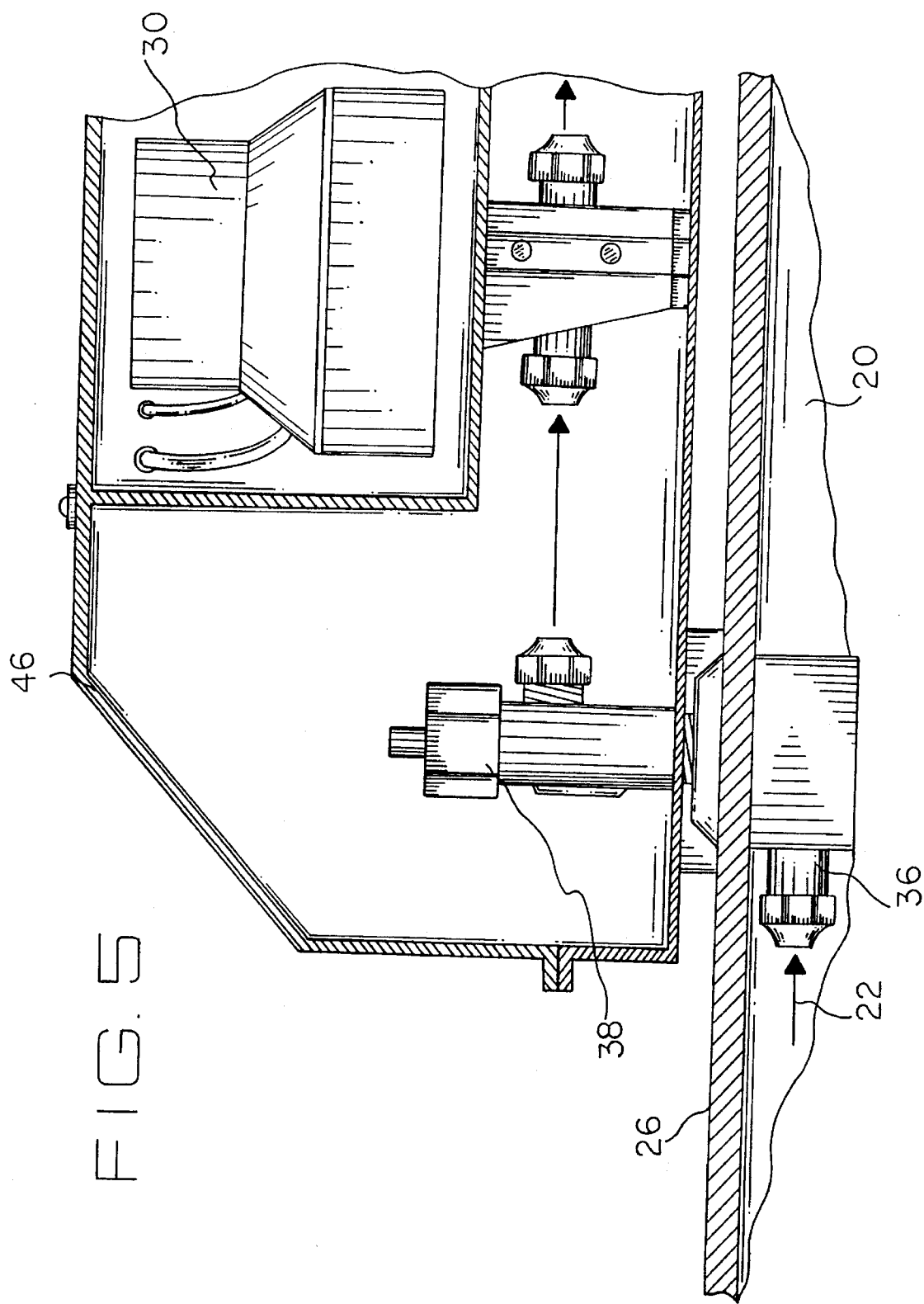

APPARATUS AND PROCESS FOR SAFELY CONTAINING AND DELIVERING HAZARDOUS FLUID SUBSTANCES FROM SUPPLY CYLINDERS

BACKGROUND OF THE INVENTION

1. Field of the Invention

The present invention relates generally to the field of chemical gas and liquid containment and delivery systems. More specifically, the present invention relates to an apparatus and process for safely delivering a hazardous fluid substance such as chlorine gas from a supply cylinder to a receiving structure or system, such as to a distribution cylinder or to a pool chlorine gas treatment system, with secondary containment and otherwise in accordance with government regulations. These regulations specifically include Toxic Gas Ordinance No. 23450, Chapter 17.78 of the San Jose Municipal Code, and the Uniform Fire Code, Article 20, Hazardous Materials.

The apparatus includes a high pressure containment vessel for receiving and safely enclosing a supply cylinder having a release valve and containing a hazardous fluid substance at a pressure above ambient. A high pressure flex line extends from the supply cylinder release valve to an automatic gas sensing valve assembly mounted in a vessel port in the vessel wall. The gas sensing valve assembly automatically shuts off the flow of gas through the vessel port when a gas leak is detected outside the containment vessel. Chlorine gas passes through the valve assembly and into a receiving structure or system, such as a gas manifold having coupling ports to which one or more distribution cylinders, also known as service cylinders, are removably connected. A back-up, manually operated valve is also provided in series with the automatic gas sensing valve assembly. The sensing valve assembly has a fail-safe-to-close design and the back-up valve is fitted with spring-returned, normal-closed or quick-turn lever handled Hastaloy™ "C" ball valves. The sensing and back-up valves both have reduced-orifice controllers.

To meet secondary containment requirements, the gas manifold is enclosed within an exhausted enclosure connected to a gas scrubbing unit. The scrubbing unit is substantially smaller than scrubbers typically used in the industry, because most of the gas is automatically sealed within the supply cylinder by the sensing valve assembly and within any distribution cylinders by reduced orifice flow controller on the manifold coupling ports. Should the supply cylinder leak, the gas it contains may be released into the scrubbing unit at a very low rate, and alternatively may be released instead into a gas cylinder rather than scrubbed and wasted.

The delivery process is inventively passive, so that dependence upon electric power for safe containment and flow is eliminated. The process includes the steps of placing a supply cylinder into a containment vessel; connecting the supply cylinder release valve to a tubing means extending through a fluid substance sensing valve assembly in the vessel wall. Optional additional steps include delivery of the fluid substance from the gas sensing valve assembly into a gas manifold; and delivering the gas from the manifold into a cooled distribution cylinder. Fluid substance contained within the supply vessel and gas manifold is maintained at ambient temperature so that gas pressure is minimized for safe retention. The distribution cylinder or other receiving structure or system is cooled below ambient to receive gas at low pressure. In this way the flow of gas results from the pressure differential between the supply cylinder and receiving structure rather than from the mechanical action of drive means, so that fluid substance containment and apparatus operation is passive, and high pressures are safely avoided.

2. Description of the Prior Art

There have long been gas delivery and transfer systems for delivering hazardous fluid substances from a supply cylinder, which is typically a one ton cylinder, into a receiving structure or system, such as a distribution cylinder, which is typically a fifteen or twenty pound cylinder. Recent government environmental and safety regulations have required that delivery or transfer take place within secondary containment. This has been accomplished in the chlorine industry in either of two ways.

One way has been to make the transfer in a room filled with massive and very costly scrubber equipment, so that if a leak develops, all gas in the supply cylinder can be very rapidly scrubbed from the air. This process makes it necessary to shut down operation in the room for one or more days and also results in the loss of all chlorine in the supply cylinder, both of these consequences being very expensive in addition to the cost of the scrubbing equipment. Should leakage take place during a power outage, particularly during a natural disaster, the scrubbing equipment would not function, so that the dangerous chlorine gas would escape into the neighborhood and into nearby ecosystems.

The other known way of transferring chlorine gas is with the use of what is known as a "coffin", which is essentially an ordinary sheet metal cabinet. The supply cylinder and distribution cylinder are both placed inside the coffin. The coffin has a release port opening into a powerful suction and scrubber assembly. In the event of supply cylinder leakage, the scrubber assembly must be activated immediately to rapidly draw away all of the escaping gas which includes the entire contents of the supply cylinder. The coffin would not contain the gas in the event that a power failure shut down the scrubber. Thus the problems of the scrubbing room are substantially presented by the coffin and scrubber containment system.

It is thus an object of the present invention to provide a hazardous fluid substance delivery system which provides the safe secondary containment required by law.

It is another object of the present invention to provide such a system which is compact and which requires minimal shutdown time in the event of a fluid substance leak.

It is another object of the present invention to provide such a system which safely retains any of the fluid substance leaking from the supply cylinder which has not reached the receiving structure or system, for gradual release into gas cylinders or into a scrubbing unit.

It is another object of the present invention to provide such a system which can release gaseous substances at a slow, controlled rate and thus requires only a small, low capacity and inexpensive scrubbing assembly.

It is still another object of the present invention to provide such a system which safely and secondarily contains the vast majority of leaking fluid substance in the event of power failure such as during a natural disaster.

It is still another object of the present invention to provide such a system which automatically stops the flow of fluid substance from the containment vessel with a valve operated by a fluid substance sensing mechanism.

It is finally an object of the present invention to provide such a system which delivers or transfers a fluid substance by passive, low pressure means and which is compact and economical to build and operate.

SUMMARY OF THE INVENTION

The present invention accomplishes the above-stated objectives, as well as others, as may be determined by a fair reading and interpretation of the entire specification.

An apparatus is provided for safely delivering a hazardous fluid substance to a receiving structure, including a supply cylinder containing the fluid substance and having a supply cylinder release port; a high pressure containment vessel having a vessel wall, for receiving and safely enclosing the supply cylinder; a high pressure first tube extending from, and in fluid communication with, the supply cylinder release port to a vessel port in the vessel wall; and a vessel valve in fluid communication with the first tube for controlling delivery of the fluid substance from the supply cylinder and from the vessel. The vessel valve preferably includes a fluid substance sensing valve assembly mounted at the vessel port, for automatically shutting off the flow of the fluid substance upon detection of the fluid substances outside the containment vessel, for automatically sealing substantially all of the fluid substance contained within the supply cylinder within the containment vessel in the event of an uncontrolled release of the fluid substance outside the containment vessel. The apparatus may additionally include at least one distribution cylinder; where the receiving structure includes a distribution manifold in fluid communication with the tube through which the fluid substance passes, having at least one port to which the at least one distribution cylinder is removably connected, the manifold having a certain manifold internal volume for containing a certain quantity of the fluid substance; an exhausted enclosure enclosing the manifold and being of sufficient internal volume to retain at substantially ambient pressure and temperature the certain quantity of fluid substance contained within the manifold; and a fluid substance scrubbing unit of sufficient capacity to scrub all the fluid substance initially within the supply cylinder at a controlled flow rate through the vessel valve. The vessel valve preferably includes a valve adaptor having a reduced orifice controller.

A process of delivering a hazardous fluid substance from a supply cylinder having a supply cylinder release valve using the above-described apparatus, including the steps of placing the supply cylinder into the containment vessel; connecting the supply cylinder release valve to the tube extending within the containment vessel; opening the cylinder release valve and the vessel valve to deliver the fluid substance from the supply cylinder and from the containment vessel. The process may include the additional steps of detecting any of the fluid substance released through a leak in the apparatus, such as in piping extending from the manifold, using the receiving cylinder supply valve for testing purposes, testing lines with gas only, and upon detection, closing the receiving cylinder supply valve. The process may include the additional steps of securing the at least one distribution cylinder to the manifold, and delivering the fluid substance from the supply cylinder through the manifold and into the least one distribution cylinder. The process may include the additional step of maintaining the fluid substance contained within the supply vessel and the fluid substance manifold at substantially ambient temperature so that fluid substance pressure is minimized for safe retention. The process may also include the step of cooling the at least one distribution cylinder below ambient temperature to receive fluid substance at below ambient pressure, to create a pressure differential between the manifold and the at least one distribution cylinder to draw fluid substance through the manifold and from the supply cylinder into the at least one distribution cylinder, at low pressures and without mechanical drive mechanisms dependent upon electric current.

BRIEF DESCRIPTION OF THE DRAWINGS

Various other objects, advantages, and features of the invention will become apparent to those skilled in the art from the following discussion taken in conjunction with the following drawings, in which:

FIG. 2 is a cross-sectional side view of the apparatus of FIG. 1.

FIG. 3 is a perspective view of the apparatus of FIG. 1 connected to a chlorine delivery manifold shown in broken lines, contained within an exhausted enclosure, and a chlorine distribution cylinder connected to one of two coupling ports on the manifold.

FIG. 5 is a side view of the preferred sensing valve assembly on the containment vessel.

DETAILED DESCRIPTION OF THE PREFERRED EMBODIMENTS

Figure 1:
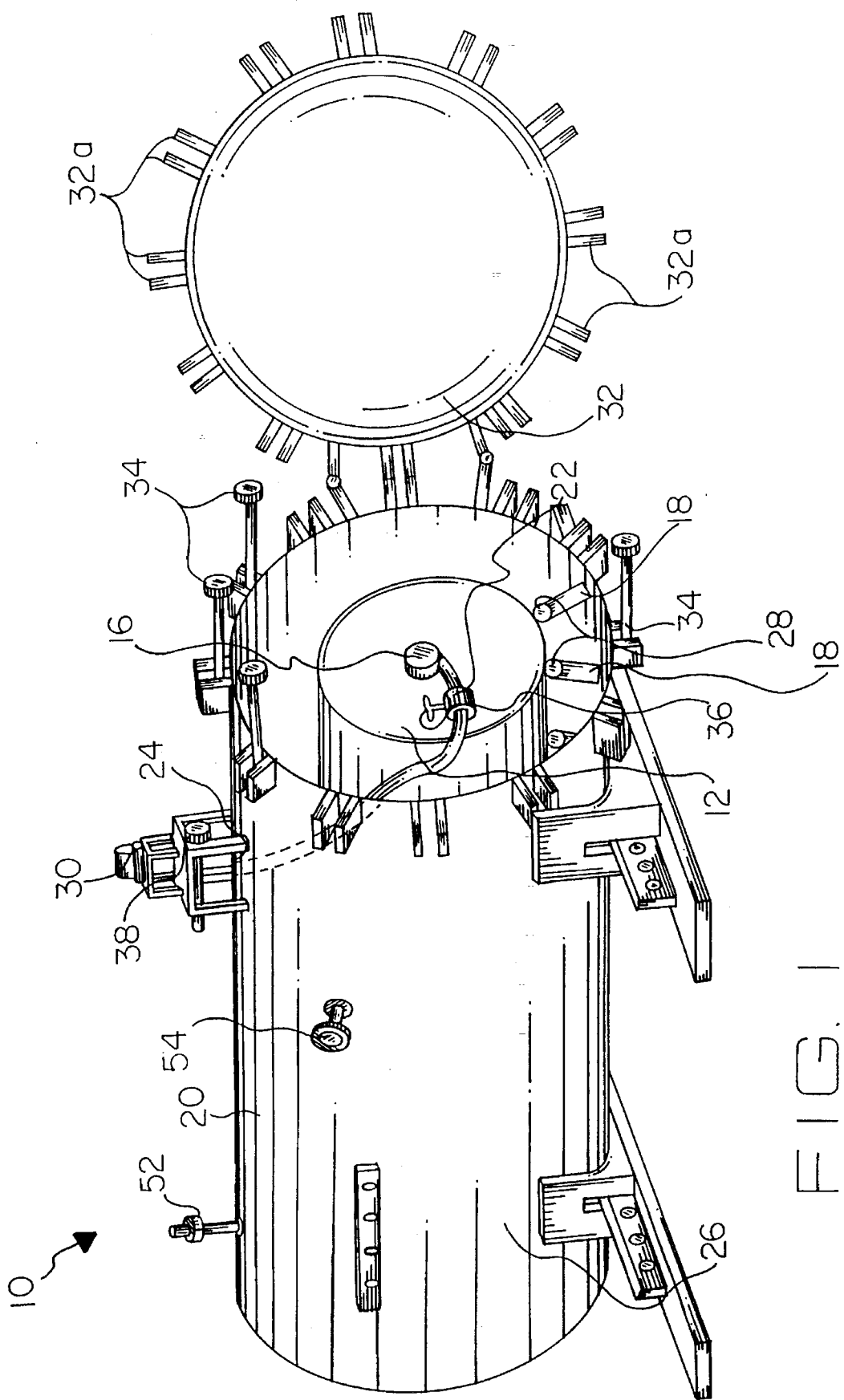
FIG. 1 is a perspective view of the inventive fluid substance containment and delivery apparatus showing the containment vessel with the supply cylinder receiving door open, revealing the flex line and excess flow shut-off valve.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiments

Figure 3A:
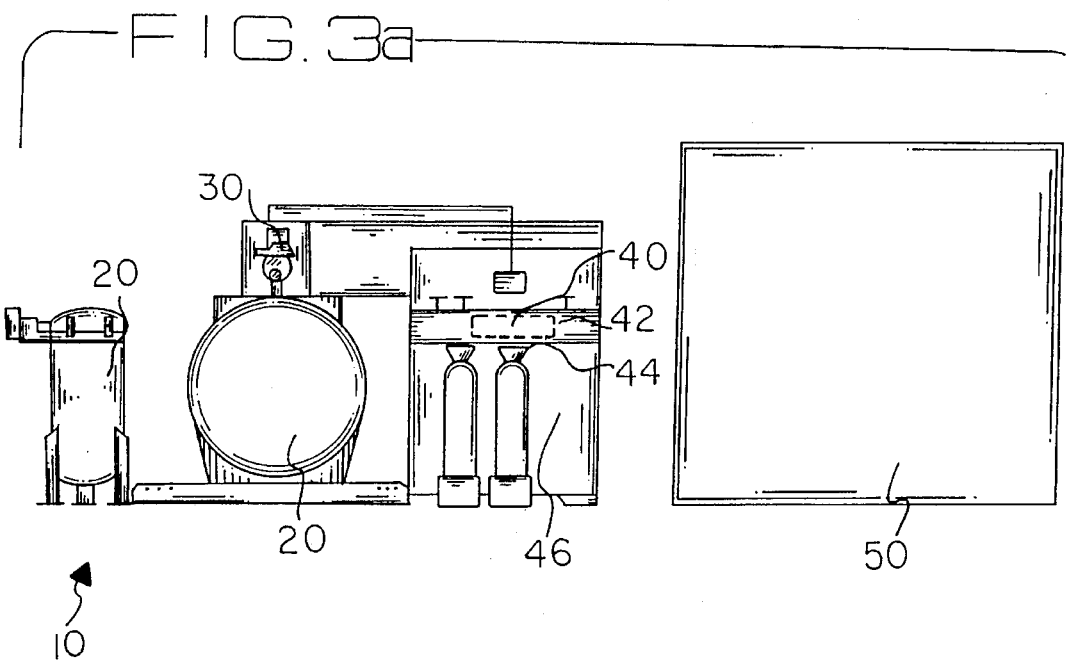
FIG. 3a is a front view of the apparatus of FIG. 3, showing fluid piping connections in greater detail.
Figure 4:
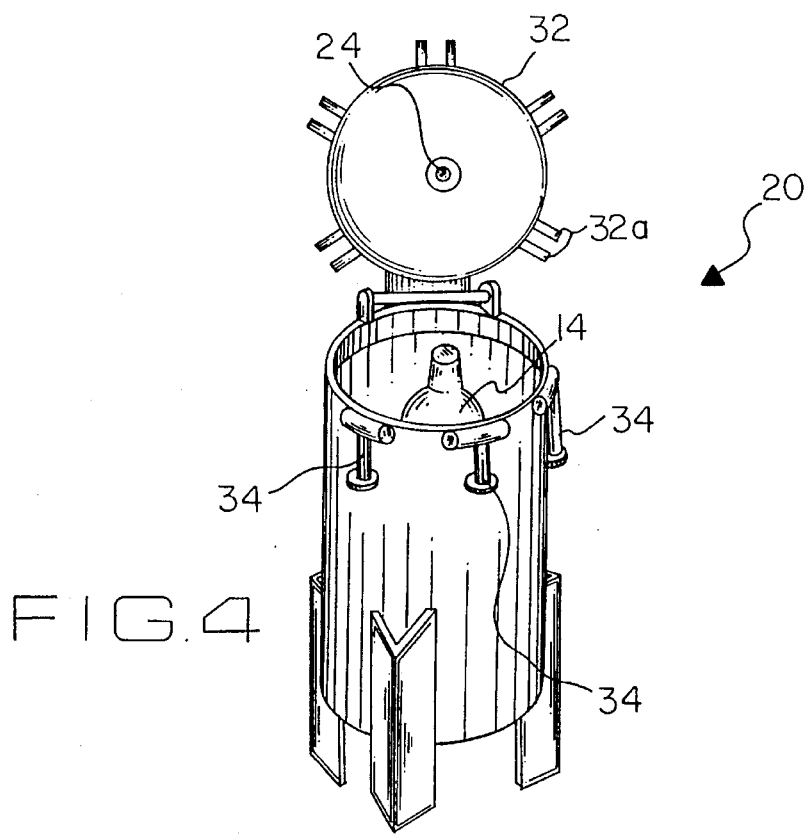
FIG. 4 is perspective view of the containment vessel for a containment of leaking twenty pound distribution cylinder.

Referring to FIGS. 1–5, an apparatus 10 is disclosed for safely delivering a toxic or otherwise hazardous fluid substance such as ammonia, sulphur dioxide, or chlorine, in gas or liquid form, from a supply cylinder 12 having a release valve 16 to a distribution cylinder or process system 14. The word "fluid" in this application is understood to refer to both gaseous and liquid states. Chlorine gas transfer is an example followed throughout this description which is illustrative of the use of apparatus 10, but which should in no way be construed as limiting.

Apparatus 10 includes a high pressure capacity containment vessel 20 for receiving and safely enclosing a supply cylinder 12. A series of wheels 18 mounted on mounting posts 28 within vessel 20 support and permit supply cylinder 12 to roll into vessel 20. See FIGS. 1 and 2, for two preferred wheel and post designs. A high pressure flex line 22 extends from release valve 16 on supply cylinder 12 to a vessel port 24 in the vessel wall 26 into which is mounted a gas sensing valve assembly 30. Gas sensing valve assembly 30 automatically shuts off the flow of gas through port 24 when a gas leak is detected outside containment vessel 20. Chlorine gas passes through valve assembly 30 into a gas manifold having coupling ports 42 to which a process system, or one or more distribution cylinders 14 are removably connected. Manifold 40 in this application is understood to include piping extending from the manifold. See FIGS. 3 and 3a.

A back-up, manually operated valve 38 is also provided for use in the event of a sensing valve assembly 30 malfunction. Sensing valve assembly 30 has a fail-safe-to-close design. The sensing and back-up valves, 30 and 38, respectively, and all adapters 44 have reduced orifice controllers for metering gas release. These reduced orifice controllers 36 permit a greatly reduced release rate of gaseous or liquid chlorine, so that a smaller scrubber unit 50 is adequate in the event of an accident. This reduced flow greatly reduces the worse-case release magnitudes. A pressure-vacuum gauge 54 is provided on containment vessel 20 to indicate to an operator when supply cylinder 12 has been totally evacuated.

Gas manifold 40 is enclosed within an exhausted enclosure 46 having a sufficient internal volume to retain the certain quantity of gas contained within manifold 40 at substantially ambient temperature. Enclosure 46 is connected to a gas scrubbing unit 50 of sufficient capacity to safely and efficiently scrub this certain quantity of gas rapidly and the remainder of the ton of gas at a gradual rate. The vast majority of the gas is automatically sealed within supply cylinder 12 by sensing valve assembly 30. A leak in supply cylinder 12 empties gas into exhausted enclosure 46. This gas can be scrubbed at a low rate because it is safely contained, and can be discharged through the scrubbing unit 50 connected to exhausted enclosure 46. Should power failure deactivate scrubbing unit 50 during a gas leak, the most gas which could be released into the environment is that contained within manifold 40. This release is negligible in comparison with the prior art release of all the gas in the supply cylinder 12.

Means for cooling a receiving structure or system, such as distribution cylinder 14, is preferably provided in the form of a top-opening electric freezer. Cooling cylinders 14 reduces vapor pressure inside cylinders 14 and causes the warmer, higher pressure chlorine from supply cylinder 12 to flow through apparatus 10 and into cylinders 14. This pressure differential filling process is safe because it eliminates the increased pressures associated with padding or heating.

Means are also provided for evacuating all residual chlorine from lines of apparatus 10, including manifold 40. The preferred evacuating means is a vacuum disposal system (not shown) that removes all chlorine gas from the lines and disposes of the chlorine into a caustic disposal tank. Apparatus 10 can also lend itself to a purge system. Containment vessel 20 is evacuated through evacuation valve 52 in vessel wall 26.

At least two containment vessels 20 are preferably provided for alternative use, one being sized to receive one ton supply cylinders 12 and the other sized to receive fifteen to twenty pound cylinders 14. The latter is primarily intended to receive, contain and safely evacuate leaking cylinders 14. See FIG. 4. Both vessels 20 have reduced-orifice gas phase venting, as above indicated, and lids 32 secured to lid flanges 32a with bolts 34.

Gas sensing valve assembly 30 preferably includes a nitrogen powered, fail-safe-to-close automatic shut-off valve. See FIG. 5. This state-of-the-art, pneumatic-spring unit is designed to interface with multiple control points. The unit is connected to chlorine detectors and/or seismic sensors, and other alarms to provide for immediate chlorine shut off. The unit is hermetically sealed, and all components are NEMA-7. Each of the following events preferably activate the automatic shut-off: (1) gas detection, (2) remote location alarm in a facility housing apparatus 10, (3) failure of emergency power, (4) seismic activity, (5) failure of primary containment, (6) activation of manual fire alarm. A mechanical excess-flow shut-off valve 48 is connected to the ton supply cylinder 12 directly.

The exhausted enclosure 46 is combined with structural seismic support of conventional design directly connected to containment vessel 20. Stationary tanks and piping systems used for regulated materials are seismically braced in accordance with the provisions of the San Jose Building Code, Chapter 17.04 of Title 17.78.310, Security.

Once again, it is to be understood that chlorine gas is merely one preferred fluid substance, of many gaseous and liquid substances, for delivery or transfer with apparatus 10.

Process

In practicing the invention, the following process may be practiced. The process includes the steps of placing a supply cylinder 12 into a containment vessel 20; connecting the supply cylinder 12 gas release valve 16 to a flex line 22 extending through the wall 26 of containment vessel 20 and through gas sensing valve assembly 30. Additional steps optionally include delivering gas into gas manifold 40; evacuating the manifold 40 of residual liquid or gas; maintaining gas within supply cylinder 12 and within manifold 40 at ambient temperature so that gas pressure is minimized for safe retention; cooling the at least one distribution cylinder 14 below ambient temperature to receive the gas at low pressure so that a flow of gas results from a pressure differential between supply and distribution cylinders, 12 and 14, respectively; and delivering the gas from manifold 40 into at least one distribution cylinder 14 and scrubbing of the small amount of remaining gas.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for safely delivering a hazardous fluid substance to a receiving structure, comprising:

a supply cylinder containing said fluid substance and having a supply cylinder release port;

a high pressure containment vessel having a vessel wall, for receiving and safely enclosing said supply cylinder;

a high pressure first tubing means extending from, and in fluid communication with, said supply cylinder release port to a vessel port in said vessel wall;

and a vessel valve in fluid communication with said first tubing means for controlling delivery of said fluid substance from said supply cylinder and from said vessel.

2. The apparatus of claim 1, wherein said vessel valve comprises a fluid substance sensing valve assembly mounted in said vessel port, for automatically shutting off the flow of said fluid substance at said vessel port upon detection of said fluid substances outside said containment vessel, for automatically sealing substantially all said fluid substance contained within said supply cylinder within said containment vessel in the event of an uncontrolled release of said fluid substance outside said containment vessel.

3. The apparatus of claim 1, additionally comprising:

at least one distribution cylinder;

wherein said receiving structure comprises a distribution manifold in fluid communication with said tubing means through which said fluid substance passes, having at least one coupling port to which said at least one distribution cylinder is removably connected, said manifold having a certain manifold internal volume for containing a certain quantity of said fluid substance; an exhausted enclosure enclosing said manifold and being of sufficient internal volume to retain at substantially ambient pressure and temperature said certain quantity of fluid substance contained within said manifold; and a fluid substance scrubbing unit of sufficient capacity to scrub all said fluid substance initially within said supply cylinder at a controlled flow rate through said vessel valve.

4. The apparatus of claim 1, wherein said vessel valve comprises reduced orifice controller means.

5. A process of delivering a hazardous fluid substance from a supply cylinder having a supply cylinder release valve using an apparatus comprising a supply cylinder containing said fluid substance and having a supply cylinder release port; a high pressure containment vessel having a vessel wall, for receiving and safely enclosing said supply cylinder; a high pressure first tubing means extending from, and in fluid communication with, said supply cylinder release port to a vessel port in said vessel wall; and a vessel valve in fluid communication with said first tubing means for controlling delivery of said fluid substance from said supply cylinder and from said vessel, comprising the steps of:

placing said supply cylinder into said containment vessel;

connecting said supply cylinder release valve to said tubing means extending within said containment vessel;

opening said cylinder release valve and said vessel valve to deliver said fluid substance from said supply cylinder and from said containment vessel.

6. The process of claim 5, wherein said apparatus additionally comprises fluid substance sensing means, comprising the additional steps of:

detecting any said fluid substance released through a leak in said apparatus, and, upon said detection, closing said vessel valve.

7. The process of claim 5, wherein said apparatus additionally comprises a manifold in fluid communication with said vessel valve and at least one distribution cylinder, comprising the additional steps of:

securing said at least one distribution cylinder to said manifold, delivering said fluid substance from said supply cylinder through said manifold and into said least one distribution cylinder.

8. The process of claim 7, additionally comprising the step of:

maintaining said fluid substance contained within said supply vessel and said fluid substance manifold at substantially ambient temperature such that fluid substance pressure is minimized for safe retention.

9. The process of claim 7, additionally comprising the step of:

cooling said at least one distribution cylinder below ambient temperature to receive fluid substance at below ambient pressure, to create a pressure differential between said manifold and said at least one distribution cylinder to draw fluid substance through said manifold and said supply cylinder into said at least one distribution cylinder, at low pressures and without mechanical drive means dependent upon electric current.

* * * * *